United States Patent [19]

Gerace

[11] Patent Number: 5,658,969
[45] Date of Patent: Aug. 19, 1997

[54] LIGHT WEIGHT PLASTISOLS AND METHOD OF MAKING SAME

[75] Inventor: Michael J. Gerace, Dayton, Ohio

[73] Assignee: Pierce & Stevens Corporation, Buffalo, N.Y.

[21] Appl. No.: 593,739

[22] Filed: Jan. 29, 1996

[51] Int. Cl.$^6$ .............................. C08J 9/32; C08K 9/06; C08K 9/04; C08L 27/04
[52] U.S. Cl. .................... 523/218; 523/204; 523/205; 524/296; 524/569
[58] Field of Search .................... 523/218, 204, 523/205; 524/569, 296

[56] References Cited

U.S. PATENT DOCUMENTS

| | | | |
|---|---|---|---|
| 5,171,766 | 12/1992 | Mariano et al. | 523/218 |
| 5,212,215 | 5/1993 | Nanri et al. | 523/218 |
| 5,356,957 | 10/1994 | Nanri et al. | 523/218 |

FOREIGN PATENT DOCUMENTS

| | | | |
|---|---|---|---|
| 0109545 | 6/1984 | Japan | 523/218 |
| 0025419 | 2/1993 | Japan | 523/218 |
| 0117575 | 5/1993 | Japan | 523/218 |

*Primary Examiner*—Peter A. Szekely
*Attorney, Agent, or Firm*—Waldron & Associates

[57] ABSTRACT

Plastisol coatings and adhesives having reduced bulk density are provided by incorporating hollow thermoplastic microspheres, wherein the surface of the microspheres is wet by a surfactant which preferentially wets the surface of the microspheres, where the total solids content of the plastisol does not exceed the critical pigment volume concentration, and where the temperature and pressure of processing and use of the microsphere filled plastisol are kept to the minimums required for effective operation. Preferred hollow thermoplastic microspheres having a thermally bonded surface coating of a solid particulate material, such as calcium carbonate, silica, or the like are employed where the thermoplastic of the microspheres is wet by a surfactant which preferentially wets the surface of the thermoplastic and where the solid particulate material on the surface is wet by a surfactant or plasticizer which preferentially wets the solid particles are particularly effective in such plastisol coatings and adhesives.

36 Claims, 1 Drawing Sheet

LIGHT WEIGHT PLASTISOLS AND METHOD OF MAKING SAME

BACKGROUND OF THE INVENTION

The present invention relates to the technical field of plastisols, and particularly to plastisols of reduced weight based on the inclusion of hollow thermoplastic microspheres to form syntactic foam plastisols. Such plastisols find a wide variety of uses in industrial and commercial coatings and adhesives, particularly in automotive coatings and adhesives.

PRIOR ART

Plastisols are formulations of thermoplastic polymers and plasticizers therefor, characterized by the fact that the components of the formulation can be combined, heated to form a homogeneous sol or solution of the resin in the plasticizer, and then cooled to a temperature at which a phase inversion occurs to produce the resin with the plasticizer homogeneously dissolved or dispersed therein.

The most common plastisols in use are based on polyvinyl chloride (PVC) and suitable plasticizers therefor, such as di-iso-nonyl phthalate (DINP), or the like.

It is common to include inert fillers and reinforcing fillers to plastisols, both to determine specific physical properties of the material and to reduce the cost of the formulations. Other common inclusions are adhesion promoters, antioxidants, ultraviolet stabilizers, dyes and pigments, biocides, flame and smoke retardants, and the like.

Plastisols have achieved wide usage in a variety of contexts, and are well established in the art of coatings and adhesives. The techniques for their formulation and use are well known, and as such define the context of the present invention.

Plastisols are typically used in considerable volume in production of industrial products. As such, they are typically applied by a variety of techniques which involve pumping of the formulations. The application to a substrate may be effected by spraying, roller application, extruding a bead onto a surface which is then spread by brushing, trowelling or the like.

In numerous contexts, it is important to reduce the weight of plastisol coatings and adhesives. Such efforts are particularly important in the automotive industry, for example, where plastisols are widely used for underbody coatings, surface bonding adhesives and sealer coatings and the like. Reduction of weight in automotive applications is directly related to increases in gas mileage, and even modest weight savings are of considerable importance. A number of techniques have been employed to reduce the weight by lowering the specific gravity of such plastisols, including physical and chemical blowing, the inclusion of glass, silica or phenolic microballoons, and the like. The existing techniques for reducing weight of plastisols are limited in their acceptance, for a variety of reasons, particularly the limited weight savings attained, the porosity produced by blowing agents, and the lack of uniformity of properties and appearance that typically result. Such formulations based on the use of rigid glass, silica or phenolic microballoons are also typically brittle and lack adequate impact resistance in a number of contexts of use. Nonetheless, the benefits of reducing weight are an important factor, and continue to be the focus of considerable attention in the art.

More recently, the development of hollow thermoplastic microspheres have offered the prospect of lower density plastisols with superior physical properties and appearance than have been attainable by other known techniques. Such microspheres have become available having, for example, diameters on the order of 10 to 200 µm, most often 20 to 100 µm, and densities of 0.06 to 0.02 g/cm$^2$, or even as low as 0.015 g/cm$^2$. The thermoplastic material of which the microspheres are formed is typically a polyvinylidene chloride or a copolymer of polyvinylidene chloride with other vinyl or acrylic monomers, such as acrylonitrile, butylene, and the like. The hollow microspheres contain a physical blowing agent, typically a lower alkane, most often a butane or pentane, or a mixture thereof. A variety of such materials are commercially available, such as those sold as Dualite® microspheres, produced by Pierce & Stevens Corporation of Buffalo, N.Y., and in somewhat different form as Micropearl™ produced by Matsumoto Yushi-Seiyaku KK of Osaka, Japan. These materials are exceptionally attractive for reducing the specific gravity or density of plastisol coatings and adhesives, and have attracted increasing attention by those working in the plastisol art. The relatively flexible and compressible nature of the hollow thermoplastic microspheres also offer significant improvements in toughness, impact resistance, and other properties in the plastisol coatings and adhesives.

PROBLEMS IN THE ART

In practice, it has proved difficult to obtain commercially acceptable plastisols by the employment of thermoplastic microspheres to reduce density. It has been observed that when such microsphere containing plastisol formulations are pumped under certain application conditions, the resulting plastisol formulation foams in use, producing undesirable porosity, an unwanted increase in density, and an unacceptable surface appearance of the plastisol coatings and adhesives. In extreme cases, the foaming may interfere with bonding of the plastisol to the substrate to which it is applied, producing coatings with inferior durability and bond strength. Such phenomena have limited the proportion of microspheres used in plastisol coatings and adhesives, and have precluded their use at all in certain applications.

We have observed that the foaming is attributable to several causal factors in the formulation, and application of plastisol coatings and adhesives, and the present invention is directed to the resolution of the problems by preventing these factors from producing such undesirable foaming of the plastisol formulations.

OBJECTS Of THE INVENTION

It is an object of the present invention to provide plastisol coatings and adhesives of low specific gravity containing hollow thermoplastic microspheres substantially free of undesirable foaming.

It is another object of the present invention to provide a method of forming and applying plastisol coatings and adhesives of low specific gravity containing hollow thermoplastic microspheres substantially free of undesirable foaming.

SUMMARY OF THE INVENTION

Plastisol coatings and adhesives having reduced bulk density are provided by incorporating hollow thermoplastic microspheres, wherein the surface of the microspheres is wet by a surfactant which preferentially wets the surface of the microspheres, where the total solids content of the plastisol does not exceed the critical pigment volume concentration, and where the temperature and pressure of processing and use of the microsphere filled plastisol are kept to the minimums required for effective operation.

Preferred hollow thermoplastic microspheres having a thermally bonded surface coating of a solid particulate material, such as calcium carbonate, silica, or the like are employed where the thermoplastic of the microspheres is wet by a surfactant which preferentially wets the surface of the thermoplastic and where the solid particulate material on the surface is wet by a surfactant or plasticizer which preferentially wets the solid particles are particularly effective in such plastisol coatings and adhesives.

DETAILED DESCRIPTION

Figure 1:
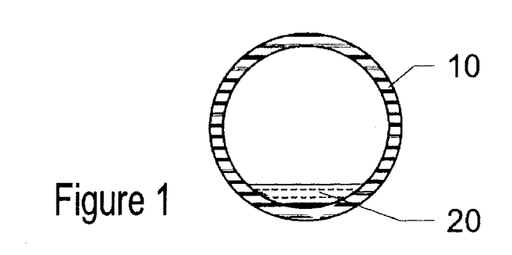
FIG. 1 is a schematic, stylized cross sectional view of a hollow thermoplastic microsphere.
Figure 2:
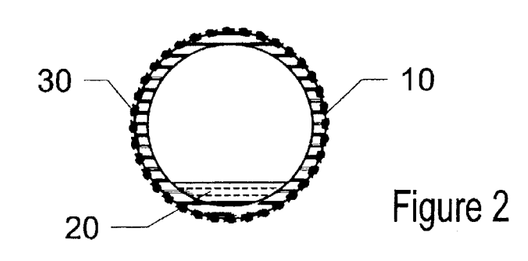
FIG. 2 is schematic, stylized cross sectional view of a hollow thermoplastic microsphere having a surface coating of thermally bonded solid barrier coating material.
Figure 3:
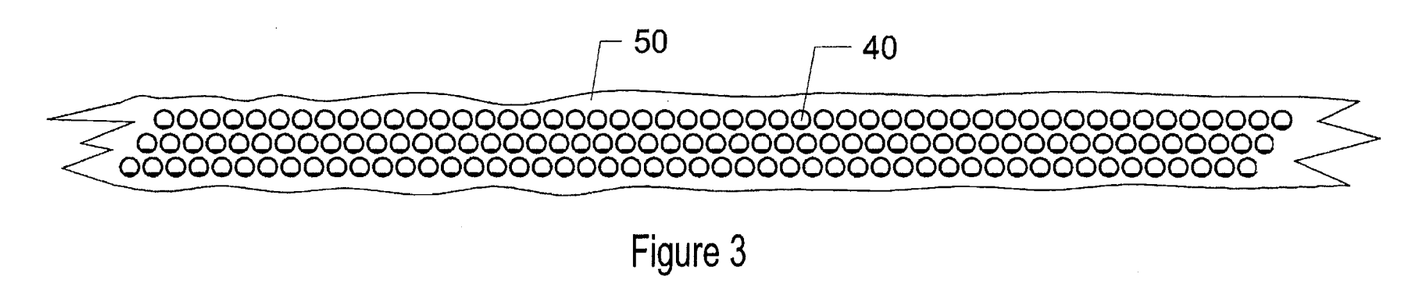
FIG. 3 is a schematic, stylized cross sectional view of a plastisol coating containing hollow thermoplastic microspheres as shown in FIG. 2.

It has been evident to many in the plastisol art that it would be desirable to employ hollow thermoplastic microspheres into plastisol coatings and adhesives to reduce density and improve physical properties, such as impact resistance and the like.

Such efforts have not met with much success to date, because of the occurrence of foaming of the formulation that makes the product unacceptable. The foaming that occurs is a phenomenon which has not had a clearly identifiable cause, but has effectively limited commercial employment of such formulations or led to limiting the amount of the hollow thermoplastic microspheres employed.

At first glance, it might seem that since the object of the inclusion of the hollow thermoplastic microspheres into the plastisol is to obtain a syntactic foam plastisol, additional foaming might be a beneficial attribute. Such is not the case, as the foaming which occurs is the result of the expulsion of the gas into the plastisol and subsequently into the atmosphere. The result is an uncontrolled, non-uniform and unpredictable discontinuity in the formulation which leaves the coating or adhesive binder porous, compromising the physical properties and producing an unattractive and unacceptable surface appearance.

A number of parameters have now been identified which make it possible to incorporate hollow thermoplastic microspheres into plastisol coatings and adhesives without the foaming problems which have characterized prior efforts in the field.

The exact causes of the foaming of the plastisols with the inclusion of hollow thermoplastic microspheres is not known with certainty, but a number of attributes have been observed which suggest a mechanism by which such foaming occurs, although the Applicant does not wish or intend to be bound thereby.

First and foremost, a certain amount of air is typically entrained with the microspheres when they are mixed into the plastisol formulation. This is not a new observation, but is mentioned for the sake of completeness. The removal of entrained air is effected, typically, by degassing the microspheres, the plastisol formulation containing the microspheres after compounding, or both.

It has also been observed that even when the microspheres, the formulated plastisol or both is degassed, the foaming problem still occurs, indicating a source of gas other than the simple entrainment of air. The problem is not resolved by longer deaeration or deaeration at greater vacuum. The only other source of gases to produce the problem is the blowing agent entrained within the hollow thermoplastic microspheres. The observations made to date are consistent with the blowing agent passing through the walls of the hollow microspheres, in an osmosis-like fashion. For example:

Foaming is increased with temperature increases during compounding and application of the plastisol.

Foaming is increased with induced heating of the plastisol in direct proportion to the frictional forces and shear of the mixing and/or application operations.

Foaming is increased in direct proportion to applied pressure when the plastisol formulation is applied by techniques which require pumping, or is otherwise subjected to high pressure and occurs, at least predominantly, when the applied pressure is released.

Foaming is increased with increasing viscosity of the plastisol formulation.

Foaming is increased when the critical pigment volume concentration of the plastisol formulation is exceeded; once the critical pigment volume concentration is exceeded, the extent of foaming is directly proportion to the extent of excess solids.

The critical pigment volume concentration is defined as the concentration of particulate solids at which the volume of the binder is just sufficient to fill the voids and interstices among the particulate solids particles; when the solids are higher in proportion, the formulation is starved for binder (resin and plasticizer) and voids occur within the mass of the plastisol.

In many coatings, including plastisols, it is often desirable and even necessary to exceed the critical pigment volume concentration to achieve certain intended properties. Most commonly, such techniques are employed because the entrainment of air within the interstices and voids within the coating greatly enhances opacity of the coating. Such characteristics are familiar to the coating art.

In the present invention, it is now possible to eliminate foaming by the employment of several specific steps in the formulation and use of the plastisols containing hollow thermoplastic microspheres, and in observing specific requirements in the composition of the plastisol.

The Compositions of the Invention

The plastisol compositions of the present invention are characterized by the following characteristics:

Plastisol compositions in accordance with the present invention comprise a thermoplastic resin, a plasticizer for said resin, an optional inert filler and hollow thermoplastic microspheres, with the improvement comprising:

A. providing said thermoplastic microspheres with a coating of a surfactant which preferentially wets the surface of said microspheres, in an amount sufficient to substantially and/or completely coat the surface of said microspheres; and B. combining said microspheres and said optional inert filler into said plastisol formulation in a proportion which does not exceed the critical pigment volume concentration of said plastisol.

Preferred plastisol composition in accordance with the present invention comprise a thermoplastic resin, a plasticizer for said resin, an optional inert filler and hollow thermoplastic microspheres, where the thermoplastic microspheres, the improvement comprising:

A. providing said thermoplastic microspheres with a solid particulate barrier coating thermally bonded to the surface thereof and a coating of a surfactant which preferentially wets the surface of said microspheres, in an amount sufficient to substantially completely coat the surface of the microspheres;

B. providing said solid particulate barrier coating with a coating of a surfactant or plasticizer which preferentially wets the surface of said barrier coating, in an amount sufficient to substantially completely coat the surfaces of the barrier coating; and C. combining said microspheres and said optional inert filler into the plastisol formulation in a proportion which does not exceed the critical pigment volume concentration of said plastisol.

It is also preferred and helpful to reduce friction effects by minimizing the viscosity of the plastisol coating or adhesive formulation under the conditions of use, and minimizing or eliminating abrasive components such as mineral fillers.

Thus, another preferred parameter is to fully wet the inert solid filler or extender with a plasticizer or surfactant prior to combining the filler into the plastisol formulation. Such a step is effective both to minimize the viscosity and to assure that the formulation does not exceed the critical pigment volume concentration. The plasticizer or surfactant employed should be compatible with the plasticizer of the plastisol binder formulation, but need not be the same material. It is thus possible to employ a plasticizer or surfactant which preferentially wets the filler or extender with greatest efficiency and lowest cost without regard to the requirements of the plastisol formulation. Since the filler does not require any wetting by the plasticizer of the plastisol binder, higher filler or extender proportions may be employed without exceeding the critical pigment volume concentration, and without reducing the plasticizer available to the resin of the plastisol.

It is an important attribute of the present invention that abrasive interactions of components of the plastisol with the microspheres are minimized.

We have found that not only do the improvements of the present invention avoid the problems of foaming, but that they also permit the incorporation of far higher proportions of the hollow thermoplastic microspheres into the plastisol formulations than have been successfully employed in the past, saving greater amount s of weight and offering even greater improvements in impact strength, chip resistance and related physical properties. Proportions of up to fifteen or even twenty percent by weight can now be employed, although lower proportions, on the order of 6 to 12% by weight will be more commonly employed. At such levels, the plastisol coating or adhesive will typically have a specific gravity of about 0.4 to about 0.8.

In cases where elevated pressures are employed, particularly prolonged static pressures, we have found that the inclusion in the plastisol of an elastomeric filler or extender serves to reduce or even eliminate the release of gas from the microspheres when the elevated pressure is released, and serves to reduce or eliminate the foaming or frothing of the plastisol.

When these criteria are employed in the composition, the plastisol will have very little or no tendency to foam during use, particularly when the following processing parameters are also observed.

The Method of Making and of Using Plastisols of the Invention

The method of using the plastisol compositions of the present invention are characterized by the following parameters:

Making a plastisol composition comprising a thermoplastic resin, a plasticizer for said resin, an optional inert filler and hollow thermoplastic microspheres, including the improvement comprising:

A. coating the thermoplastic microspheres with a surfactant which preferentially wets the surface of the microspheres, in an amount sufficient to substantially completely coat the surface of the microspheres;

B. combining the microspheres and the optional inert filler into the plastisol formulation in a proportion which does not exceed the critical pigment volume concentration of the plastisol;

C. mixing and pumping said formulation at the lowest effective temperatures and pressures required to produce and apply the plastisol composition.

Making a preferred plastisol composition comprising a thermoplastic resin, a plasticizer for said resin, an optional inert filler and hollow thermoplastic microspheres, where the thermoplastic microspheres having a solid particulate barrier coating thermally bonded to the surface thereof, including the improvement comprising:

A. coating the exposed microsphere polymer surface area of the solid particulate coated thermoplastic microspheres with a surfactant which preferentially wets the surface of said microspheres, in an amount sufficient to substantially completely coat the surface of the microspheres;

B. coating the solid particulate barrier coating with a surfactant or plasticizer which preferentially wets the surface of said barrier coating, in ana amount sufficient to substantially completely wet the surfaces of the barrier coating; and C. combining the microspheres and said optional inert filler into the plastisol formulation in a proportion which does not exceed the critical pigment volume concentration of the plastisol.

D. mixing and pumping said formulation at the lowest effective temperatures and pressures required to produce the plastisol composition.

When elevated pressures are required, particularly prolonged elevated static pressures, the inclusion of a compressible elastomeric inert filler into the plastisol is preferred.

The Microspheres

Hollow thermoplastic microspheres of the type employed in the present invention found their origin in Morehouse, U.S. Pat. No. 3,615,972.

Microspheres are generally available in the form of a wet cake, which is typically about 40 weight percent water, about 60 weight percent unexpanded microsphere beads, and minor additional amount s of the materials employed in the manufacture of the beads by the process of the Morehouse patent, i.e., "wetting agents." Before use in plastisols, the microspheres in such wet cake are dried and, ordinarily, expanded to a density of from about 0.06 to about 0.015 g/cm$^3$.

Dry, expanded microspheres are available from Pierce & Stevens Corporation, 710 Ohio Street, P.O. Box 1092, Buffalo, N.Y. 14240-1092, which are predominantly polyvinylidene chloride microspheres with an inclusion of isobutane as the blowing agent. Some of the microspheres presently available contain co-monomers in minor proportions in the bead polymerization. These materials are preferred in the present invention, primarily for their availability and reasonable cost. The co-polymers generally have higher $T_g$ and expansion temperatures.

As the Morehouse patent indicates, microspheres can be from a rather wide diversity of thermoplastic polymers. In practice, the commercially available microspheres are generally limited to polyvinylidene chloride or a random copolymer of vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely available. The present invention is applicable to any thermoplastic of which microspheres is made, but since the polyvinylidene chloride based materials are those most readily available to the art, the discussion herein will be directed predominantly to those materials. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, particularly propane, butane, pentane, and mixtures thereof, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres.

In unexpanded form, the microspheres can be made in a variety of sizes, those readily available in commerce being most on the order of 2 to 20 μm, particularly 3 to 10 μm. When expanded, these material will have bead diameters on the order of 10 to 100 μm. It is possible to make microspheres in a wider range of sizes, and the present invention is applicable to them as well. It has been demonstrated, for example, that microspheres can be made from as small as about 0.1 μm, up to as large as about 1 millimeter, in diameter, before expansion. Such materials are not generally available.

While variation in shape are possible, the available microspheres are characteristically spherical, with the central cavity containing the blowing agent being generally centrally located.

Dry, unexpanded microspheres typically have a displacement density of just greater than 1 g/cm$^3$, typically about 1.1.

When such microspheres are expanded, they are typically enlarged in diameter by a factor of 5 to 10 times the diameter of the unexpanded beads, giving rise to a displacement density, when dry, of 0.1 or less, most often about 0.03 to 0.06 g/cm$^3$. In the present invention is now possible to achieve expanded densities as low as 0.015 to 0.020 g/cm$^3$.

While such hollow thermoplastic microspheres are difficult to dry and expand, several versions are available to the art. In dry, expanded form, substantially any of them can be wet with a suitable surfactant, one which preferentially wets the surface of the microsphere, for use in the present invention. Generally, wetting the surface of the microspheres is accomplished simply by thoroughly mixing the microspheres with the surfactant prior to incorporation of the microspheres into the ingredients of the plastisol formulation. It is generally necessary to employ an amount sufficient to completely wet the surface of the microspheres. The use of any excess of the surfactant is not cost effective, and is thus generally to be avoided.

Preferred microspheres are those produced with a solid particulate coating on the surface, described in one or more of U.S. Pat Nos. 4,722,943; 4,829,094; 4,843,104; 4,888,241; 4,898,892; 4,898,894; 4,912,139; 5,011,862; 5,180,752; and 5,342,689. Hollow thermoplastic microspheres of these types are commercially available from Pierce & Stevens Corporation, of Buffalo, N.Y., as Dualite® microspheres.

When such microspheres are employed, it is generally preferred that the solid particulate coating be of the same material as the inert filler employed in the plastisol formulation, although other materials may be employed as well.

It is also possible to produce microspheres wet with a suitable surfactant for use in the present invention directly from "wet cake" by the following technique:

Expansion to the lowest densities heretofore achieved in the prior art procedures is now possible in a surfactant based system. The microsphere density can be less than 0.03, often 0.02 to 0.015 g/cm$^3$.

Low proportions of the surfactant, or mixture of such a surfactant with a solid, can be employed without agglomerates in the product.

Closer control of the bead expansion is achieved, resulting in lower proportions of under-expanded, over-exploded and disrupted beads.

Process control requirements are simple and equipment requirements are undemanding, permitting operation in inexpensive equipment with simple control requirements while still achieving high levels of product quality, uniformity and productivity.

The level of agglomerates consistently achieved, of less than 1%, often less than 0.1%, of the product permits the elimination of post-expansion processing to separate out agglomerates from the product.

The very low levels of over-expanded beads, disrupted beads, and bead fragments permits the elimination of post-expansion processing to separate out polymer fragments and other high density fractions.

The surfactant coating will facilitate subsequent or concurrent compounding operations, making mixing of the microsphere component into formulations and the achievement of homogeneous dispersion of the microsphere component faster, simpler and more reliable.

When a blend of both surfactant and solid particulates are employed as a the surface barrier surfactant coating, a unique combination of properties can be provided.

The combination of all the foregoing result in materially reduced production costs with materially increased product quality, and a broader range of products than heretofore available.

It has now been observed that the surfactants can be employed, in surprisingly modest proportions by weight, which prevent agglomeration of the microspheres during drying and upon expansion, and that such materials actively and effectively suppress dusting of the expanded products as well. This combination of features and observations has led to the development of effective expansion of microspheres by first mixing the microspheres with the surfactant, or mixture of such a surfactant with a solid, until the bead surface is fully wet, followed by controlled drying and recovery of the product. The microspheres remain in the desired unicellular condition, and substantially free of undesirable agglomeration. Subsequent or concurrent expansion can be up to the limits, as established by prior efforts in the art, to achieve microsphere densities less than 0.03 g/cm$^3$, and as low as 0.015 to 0.02 g/m$^3$. In the context of the present invention, densities of about 0.03 to about 0.06 g/cm$^3$ are generally preferred.

It is important to the present invention that in the context of most uses of the microspheres, it is the volumetric considerations which are most often of dominant importance, so that even quite substantial proportions of the surfactants on a weight basis form a negligible or very minor component on a volumetric basis. For example, employing DINP (di-iso-nonyl phthalate) as the surface barrier surfactant, the volume and weight relationships of the dry, expanded microspheres with varying amount s of DINP show the relationships detailed in TABLE I.

TABLE I

EXPANDED MICROSPHERES BLENDED WITH DINP MICROSPHERE CONTENT OF PRODUCT

| WEIGHT % MICROSPHERES | VOLUME % MICROSPHERES | COMPOSITE DENSITY (g/cm$^3$) |
|---|---|---|
| 90 | 99.8 | 0.022 |
| 80 | 99.5 | 0.025 |
| 70 | 99.1 | 0.028 |
| 60 | 98.6 | 0.033 |
| 50 | 98.0 | 0.039 |
| 40 | 97.0 | 0.048 |
| 30 | 95.4 | 0.064 |
| 20 | 92.3 | 0.092 |
| 10 | 84.4 | 0.169 |

NOTES: Data are based on Microspheres at 0.02 g/cm$^3$ and the DINP at 0.965 g/cm$^3$.

As the relationships in Table I show, even quite large proportions of DINP by weight represent a minor fraction of the volume of the expanded product. (Since the density of the plastisol is normally considerably higher that that of DINP, the composite density or specific gravity of the plastisol containing equivalent volume percentages of the microspheres will be significantly higher, as illustrated below.) Particularly since it is possible to find such materials as entirely conventional wetting agents, plasticizers and the like in many plastisol systems of interest for the use of the microspheres, it is generally preferred to employ such materials as the surfactants in the present invention. It will often be advantageous to employ more than one type of surfactant, or mixture of such a surfactant with a solid, in mixtures and combinations with one another.

In use of the expanded microspheres, such materials should be compatible with other constituents of the plastisol formulation. It may be necessary to make corresponding adjustments in the loading of such components in the formulation to compensate if necessary for the increment included with the microspheres. A wide diversity of such materials will meet the functional requirements of the present invention, so that it is possible in almost all circumstances to find a surfactant, or mixture of such a surfactant with a solid, compatible with the formulating requirements of the intended end use.

It has been observed that with appropriate levels of such surfactants, the tendency of the microspheres to agglomerate, or to stick to heated surfaces of drying equipment and expanding equipment is effectively eliminated, and the dusting of the final expanded product is materially reduced, if not effectively eliminated.

By the selection of non-flammable surfactants under the conditions of the operating and processing characteristics of the mixture, it has become possible to employ equipment that permits effective subsequent or concurrent expansion at temperatures where the need for an inert atmosphere is eliminated without the introduction of substantial fire and explosion hazards. This represents a quite material reduction in manufacturing expense, and a real gain in system safety. The microsphere beads produced by the present invention are generally free from dusting, and do not require an inert atmosphere or other processing provisions intended to control dusting related hazards.

When necessary, of course, flammable materials may be employed as the surfactant, or mixture of such a surfactant with a solid, if adequate safety precautions are employed, although it will generally by preferred to avoid such materials whenever possible.

As those of ordinary skill in the art will readily recognize, there are a substantial number of parameters which govern the method and the products produced in the present invention. Each of the significant parameters, is hereafter discussed in turn in relation to the present invention.

While the microspheres are produced in an aqueous suspension, it is common to break and de-water the suspension, and to supply the microspheres in the form of a "wet cake" of about sixty percent solids. This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The drying operation is conveniently based on the use of conventional contact type, indirect heat exchange mixing driers with high speed, high shear capabilities. A wide diversity of types of equipment are applicable. In general terms, the requirements are for good temperature control, good mixing of powder and granular materials, and high shear, optionally with operation at reduced pressure provided, and the removal and recovery, preferably with condensation of the evaporated water. Active cooling of the microspheres, either in the mixing drier itself, or in ancillary equipment is also optional.

There is a great diversity of mixing driers available, at almost any desired scale of operations which meet the foregoing criteria with a capability of either batch or continuous operation in the context of the present invention. As a general rule continuous operation is preferred.

The surfactant, or mixture of such a surfactant with a solid, in the present invention is any one of a wide diversity of materials which meet the requirements of the intended function. It is required that the surfactant, or mixture of such a surfactant with a solid, be a free flowing surfactant, or mixture of such a surfactant with a solid, at the temperature and pressure of the drying operation, that it not react chemically with the microspheres, and preferably not with the other constituents of the system, e.g. the wetting agents and related components of the wet cake and, at the temperature of the expansion, that it function to separate the microspheres undergoing expansion so that they do not come into contact and bond to one another.

The surfactant, or mixture of such a surfactant with a solid, may be selected from one or more components meeting the following general characteristics:

The barrier coating material should be a non-solvent for the thermoplastic polymer of the microspheres, and preferably should not swell the polymer of the microspheres.

The surfactant should freely wet the surface of the microspheres.

The surfactant should not polymerize, oxidize, degrade or otherwise react under the conditions of mixing, drying, handling, packaging or storage employed.

The surfactant must have a melting point below the temperature of the drying operation, which may be conducted at any convenient temperature where water has a substantial vapor pressure, preferably at least about 100° C., and preferably where bead expansion does not occur, usually at least 20° C. below $T_g$ of the microsphere polymer.

If the surfactant has a melting point above ambient, it is preferred to cool the coated and dried microspheres below that temperature with mixing at a shear which produces a granular product.

In addition, the surfactant should have a boiling point above, and preferably substantially above, the temperature of the drying process and the subsequent or concurrent expansion process.

The selection of suitable surfactants among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:

One primary function of the surfactant, or mixture of such a surfactant with a solid, is to prevent the microspheres from coming into direct contact with one another and with the surfaces of the processing equipment during expansion and thus to prevent them adhering. The barrier coating material wets the surface of the microspheres, and forms a barrier between the thermoplastic material and any other materials with which it might otherwise come into contact.

When combinations of different materials are employed as the surfactant, or mixture of such a surfactant with a solid, it is possible to stay within the compounding requirements of virtually any designed formulation.

The microspheres are homogeneously dispersed in the surfactant in a composite product. In most circumstances, the dried microspheres will be in a relatively dry, free-flowing granular form in cases where the melting point of the surfactant is above ambient. When the surface barrier surfactant remains liquid at ambient temperatures, the composite product will be a coherent, flowable floc-like mass at relatively high proportions of surfactant to microspheres. At lower proportions of the surfactant, the mass will remain relatively coherent, in the form of a number of loosely associated "clumps" which may be somewhat granular or powder-like in character. Such "granular flocs" permit the handling of the composite like a moist powder or granular material in solids handling and processing equipment, and still afford the compounding advantages of a liquid dispersion; these forms of the composite are accordingly generally preferred for many of applications. In the usual proportions, as described herein, the mass of the dispersion will exhibit a viscosity dependent on the specific surfactant employed. The flocculation occurs with no agglomeration of the microsphere, which remain in discrete form. If the microspheres are subsequently or concurrently expanded, all the forgoing characteristics are preserved.

By virtue of the coherence provided by the flocculant-like action of the surfactant, even at very low proportions of the surfactant the product exhibits very low dusting. In addition, these same properties permit the drying of microsphere with very low relative proportions of the surface barrier surfactant when compared to particulate solids, and permits the effective production of the composite at lower densities than have been practical previously. In turn, syntactic plastisol foams made from the composite have the potential for lower densities as well.

Since the surfactant preferentially wets the surface of the microspheres, when the composite is formulated into plastisol systems, excess surfactant will often be dissolved or dispersed in the system, while the surface of the microspheres will remain wet with the surfactant rather than the final formulation, so that the final formulation meets the criteria defined herein. In syntactic foams, for example, compression strength compression set, impact strength, and some or all tensile properties will be improved. When the syntactic foam product is an adhesive, adhesive bond strength may be considerably enhanced.

These characteristics will not be lost if a particulate solid is employed in conjunction with the surfactant. In such cases, the solid particulate will not be bonded to the surface of the microspheres, and will become dispersed into the binder matrix of the plastisol during compounding.

It is a characteristic of the present invention that the handling ease of a solid material is combined with the compounding and mixing ease of a liquid. As a result, processing is greatly facilitated, as the microsphere component typically will be dispersed into the formulations with the ease of mixing a liquid.

The surfactant, or mixture of such a surfactant with a solid, is used in the present invention in an amount sufficient to permit the expansion of the microspheres without sticking to the equipment employed or forming agglomerations of microspheres. While this amount will vary depending on the particular equipment employed, and with the particular processing conditions, the surfactant, or mixture of such a surfactant with a solid, will most often be in the range of about 1 to 97 weight percent of the mixture of barrier coating material and microspheres, on a dry weight basis. As a general rule, in most circumstances the amount employed should be the least amount that will reliably and consistently achieve the defined function of the barrier coating material. It is generally preferred that the barrier coating material be employed in mounts less than 90 and preferably less than 80 weight percent of the blend. This normally results in a expanded product which is more than 90 volume percent microspheres. Because of the considerable surface area of the microspheres, less than about 1 weight percent of the surfactant may result in incomplete surface wetting which may lead to subsequent difficulties. In general it is preferred to employ about 1 to about 5 weight percent of the surfactant.

Since the predominant concerns in most uses of microspheres is with the volumetric proportions, even quite considerable proportions by weight of the surfactant, or mixture of such a surfactant with a solid, can be included without detriment in many end uses. When substantial amount s of the surfactant, or mixture of such a surfactant with a solid, are introduced as a component of the microsphere formulation, appropriate allowances for this component should be made in the compounding of materials.

An excess of the minimum amount of surfactant, or mixture of such a surfactant with a solid, required to prevent agglomeration may be employed when desired, but it is generally desirable to avoid proportions substantially greater than the amount which will reliably and completely wet the surface of the expanded microspheres.

In the present invention, the optional expansion of the microspheres is accomplished by heating with active mixing, optionally at low pressure, in admixture with the surfactant, or mixture of such a surfactant with a solid. Contact drying processes employing indirect heat exchange are generally the most effective, but in the context of the present invention, must be adapted to accommodate the particular and unusual conditions of operation, as described infra.

The expansion operation may be conducted in a plow mixer, such as those available from Littleford Bros., Inc., of Florence, Ky. These mixers produce the vigorous mixing required to achieve complete dispersion and intermixing of the microspheres and the surfactant, or mixture of such a surfactant with a solid, and provides the heat exchange capacity to effectively remove the water from the mix. The mixer may be vented to provide for removal of volatiles, under reduced pressure or vacuum if appropriate.

In the present invention, the use of active high shear mixing is preferably employed in the mixing and, when employed, in the expansion steps. In prior processes, substantial shear was avoided to prevent rupture of the microsphere beads, particularly at higher temperatures employed to soften the surface of the beads to achieve expansion. We have observed that at the lower, very controlled temperatures employed for the operation of the present invention, the beads are not ruptured at quite substantial shear levels.

We observe that the operation of the plow mixer is generally sufficient to eliminate agglomerates in the final product. The fully expanded product is obtained substantially free of agglomerates, i.e. agglomerates constitute less than 1%, and often less than 0.1%, of the total product.

It will be clear to those of ordinary skill in the art that the term "active high shear mixing" as employed in the present invention is ultimately a functional term, signifying a level of shear at least sufficient to assure wetting of each individual microsphere bead with the surfactant and to eliminate aggregates in the dried product, and will be less than the level at which significant disruption of the beads occurs. Specific values of the minimum and maxima will be dependent on the specific equipment employed and the particular conditions of its usage and operation.

The plow mixer is operated at temperatures at which expansion occurs. Affording exceptional control over the process. When mixing and expansion are complete, the surfactant, or mixture of such a surfactant with a solid, will form a substantially homogeneous blend with the microsphere beads substantially free of agglomeration. The microsphere component can be expanded to a density as low as about 0.015 grams per cubic centimeter.

The expansion can be carried out in any convenient equipment, in either batch or continuous operations suited to effect heat transfer to the microspheres. Since the adherence of the surfactant, or mixture of such a surfactant with a solid, is maintained at expansion temperatures, and since the water, was previously removed, only the thermal requirements for expansion need to be considered and controlled.

It has been found that the homogeneous blend produced in the mixture can be expanded with low shear mixing to aid in uniform and efficient heat transfer by indirect heat exchange in very simple and inexpensive equipment. High speed, high shear mixing is not required in the expansion operation, so long as the dry beads to be expanded already have reduced agglomerates and have been fully wet by the surfactant and achieved sufficient homogeneity in the blend.

While the expansion can be conducted in the plow mixer, it will generally be desirable to expand, continuously if desired, in faster, less expensive equipment. Suitable for such use are the Solidare® continuous heat transfer units available from Bepex Corporation of Rolling Meadows, Ill.

The expansion equipment must provide the energy for the expansion alone. The heat input requirement is not large, and in most circumstances achieving a bead temperature (depending on the specific polymer) at which expansion occurs, as previously defined, there will be little difficulty in attaining the desired degree of expansion. In many circumstances, full expansion may be desired, i.e., to a microsphere density of less than 0.03 g/cm$^3$, preferably about 0.02 g/cm$^3$ (without the surfactant, or mixture of such a surfactant at with a solid, ), although any desired degree of expansion can be obtained, from none to an expanded microsphere density as low as 0.015 g/cm$^3$. In other contexts, less than full expansion is more appropriate, to a density of about 0.03 to about 0.06 g/cm$^3$.

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also useful control parameter, since there is a definite duration of the expansion process. Even when adequate temperatures are achieved, if the residence time at temperature is too short, the expansion may be insufficient. If the time is too long, the microspheres themselves may be over-expanded and disrupted, leaving broken spheres and polymer fragments and grit in the product, with attendant losses of production. While heat transfer rates are generally dependent on the specific equipment employed, residence times on the order of 0.5 to 3 minutes are often sufficient.

The temperatures for expansion are generally near, but not materially above, the glass transition temperature of amorphous materials and melting temperature of crystalline polymers. These matters are discussed in more detail in the Morehouse patent.

It is the function of the surfactant, or mixture of such a surfactant with a solid, to prevent the formation of aggregates of the microspheres to the maximum attainable degree. In most equipment this particular requirement is facilitated by the use of continuous, low shear mixing of the material in the expander. Effective mixing also promotes even and uniform heat transfer to the particulate materials.

The degree of expansion can range from substantially none, to the known limits of expansion. This parameter is determined by the temperature, the residence at temperature, and to a lesser degree, by the pressure in the system.

Expansion requires that the blowing agent develop a substantial internal pressure (as compared with the pressure external to the microsphere beads), and that the polymer become softened enough to flow or expand under the effect of the internal pressure. This generally means that the polymer must be heated to a point near its melting or glass transition temperature, or very slightly above, typically about 120° C. for polyvinylidene chloride homopolymer based microspheres. If the polymer temperature is too high, the microspheres will over-expand, burst, and collapse. The upper limit of temperature should be about 180° C. for the co-polymer beads, and preferably no higher than 150° C. for the polyvinylidene chloride. At these higher temperatures, the residence time at temperature should be brief.

As the temperature is raised to the point at which the microspheres begin to soften and expand, and their surface area becomes tacky, the surfactant, or mixture of such a surfactant with a solid, wets to the surface and prevents agglomeration, and good mixing operates to maximize the extent of heat transfer to the microspheres at this stage in the process. The extent of the mixing is not narrowly critical, so long as the mixing maintains a uniform, substantially homogeneous blend of surfactant, or mixture of such a surfactant with a solid, and microspheres and relatively even heat transfer is obtained.

It is generally preferred to permit the dried and expanded microspheres to cool before they are collected and packaged or otherwise handled. This minimizes the degree to which handling can disrupt the bead structure while the polymer is in the plastic state. Active cooling may be employed if desired.

The resulting microspheres with their coating of the surfactant can be conveniently recovered from the expander, collected and handled by entirely conventional procedures and equipment usually employed in such operation for dealing with powdered or granular materials. When unusually high proportions of a surfactant are employed which is a liquid at ambient temperatures, handling equipment usual for such surfactants may be employed.

The microspheres will have an adherent surface coating of the surfactant, or mixture of such a surfactant with a solid. The surfactant, or mixture of such a surfactant with a solid, will completely coat the surface in a continuous layer and fully wet the surface. By varying the proportions of the barrier coating material and the microspheres, the thickness of the coating may be controlled.

The microspheres of the present invention will often have a low incidence of deformed, non-spherical shapes when compared to the dried and expanded microspheres from the processes of the prior art. It has been found that the level of disrupted microspheres, where the hollow structure with a continuous form is broken, are not frequent, and are as low or even lower than the norms of the prior art processes.

The microsphere product of the present invention can be expanded to very near the limit of expandability, i.e., to a density of less than about 0.03, often 0.02 or even 0.015 g/cm$^3$. Higher densities are also possible and may be preferred. When the barrier coating material is taken into account, the composite density will, of course, be somewhat higher. Thus the composite density of the product will be determined by the density of the particular barrier coating material employed, the amount of the barrier coating material included, and the degree of expansion. Those of ordinary skill in the art will be able to readily determine the composite density of the product from the information and guidance provided in the present disclosure.

Most importantly, the expanded beads of the present invention will have less than one percent, and often less than 0.1 percent agglomerates. In the present invention, this signifies that at least about 99.9 percent, will pass a 100 mesh screen. This compares to the prior art dry expanded beads produced by our prior method or by spray drying where acceptable results have represented product wherein from 3 to 10 percent is retained on an 80 mesh screen while only about 97 percent, and often as little as 90 percent will pass a 100 mesh screen. In many circumstances, particularly when the microspheres exceed about 30 weight percent of the blend, even higher levels of agglomerates, well in excess of 10 percent of the product, may be retained on the 80 mesh screen by the prior art procedures. In the present invention, the very low level of agglomerates is attained up to 80 percent by weight (in excess of 99 percent by volume). Such low proportions of the surfactant, or mixture of such a surfactant with a solid, may be highly desirable in some application of the product.

It is, of course, possible to utilize the foregoing technique with dry unexpanded microspheres as well, simplifying the procedure by eliminating the requirement and added processing required for the removal of water from the microsphere wet cake.

If dry expanded microspheres are available, of course, it is possible to simply mix the microspheres with the appropriate wetting agent prior to use, to assure complete wetting of the microsphere surface with the added wetting agent.

The Microsphere Surfactant

While DINP can be employed to wet the surfaces of the microspheres, its use is not preferred when DINP is also employed as the plasticizer component of the plastisol, as the plasticizer will not preferentially wet the surface of the microspheres in such a case.

It is important to the present invention that the surfactant employed preferentially wet the surface of the microspheres to avoid extraction of the surfactant into the plastisol binder component.

A variety of surfactants can be employed in the present invention. As those of ordinary skill in the art will clearly misunderstand, the selection of suitable surfactants is dictated by the requirement that the surfactant preferentially wet the surface of the microspheres. The requirement will be met by selecting surfactants which have a higher affinity for the polymer material of the microspheres than for the other ingredients in the plastisol formulation. Such selection will ordinarily be based on assessment of the Gibbs free energy (surface energy) of the several components, selecting surfactants which most closely match the specific polymer of the microspheres. Such surfactants may be non-ionic, cationic, anionic or mixed in character.

Among the types of surfactants particularly preferred for wetting the polyvinylidene chloride based homopolymer and copolymer microspheres preferred for use in the present invention are the halo-aliphatic, and particularly fluoro-aliphatic non-ionic esters and amides, typified by Fluorad® FC-430 and FC431, available from 3 M Corporation, Minneapolis, Minn.

Another preferred group of plasticizers for wetting the polyvinylidene chloride based homopolymer and copolymer microspheres preferred for use in the present invention are the polysiloxanes. The polysiloxanes are exemplified by SAG 100®, and SAG-1000®, Silwet L-77®, Silwet L-7500°, Silwet L-7608®, and Y-12630, all available from OSi Specialties, Inc., Danbury, Conn.; BYK-306® and BYK-341®, available from BYK Chemie USA, Inc., Wallingford, Conn.; Dow Corning Antifoam A® and Dow Corning 163 Additive®, available from Dow Coming Corporation, Midland, Mich.

Still another group of plasticizers, particularly in cases where material costs outweigh optimal performance, are the long chain fatty acid ester anionic surfactants, such as Disperplast-1142®, available from BYK Chemie USA, Inc., and related materials such as Vyscobyk-5050®, and Vyscobyk-5025®, also available from BYK Chemie USA. There are many other available surfactants familiar to those of ordinary skill in the art. These surfactants can be used alone or in combination.

The aamount to be employed will be sufficient to completely wet the surface of the microspheres. For some surfactants, that aamount will be as low as 100 ppm by weight, and will not often exceed 1% by weight. The specific aamount to be employed will depend on the specific properties of the surfactant and on the surface area of the microspheres to be wet. Determination of suitable amounts to fully wet the surface is a routing determination for those of ordinary skill in the art.

The Barrier Coat Surfactant or Plasticizer

When the preferred microsphere having a solid particulate surface barrier coating as described above are employed, the surfactant for wetting the surface of the microsphere may not be fully effective to wet the surface of the solid particulate of the barrier coating. In such cases, it is preferred to add to the microsphere sufficient wetting agent or plasticizer to fully wet these components as well to prevent the microspheres from absorbing plasticizer from the plastisol and altering the composition. In addition, fully wetting the solid coating serves to lubricate the microspheres, reducing friction and heat increases during mixing and pumping.

The simplest and most common procedure will be to wet the surface coating with an increment of the plasticizer employed in the base plastisol formulation, e.g., DINP or the like.

The Plastisol Formulation

The present invention is generally applicable to all plastisol formulations, without regard to specific compounding variations in the resin, the plasticizer, the optional inert extenders and fillers employed, and other specialized compounding ingredients, such as adhesion promoters, antioxidants, ultraviolet stabilizer, biocides, pigments, dyes, flame retardants, water scavengers and the like. The specifics of the plastisol formulation are the context of practice of the present invention but are generally and widely known in the art, and do not themselves constitute a part of the invention.

Such plastisol formulation are typified by formulations such as those employed in the Examples herein, but it should be noted that the specific plastisol formulations employed therein are merely exemplary and should not be construed as limiting on the scope of the invention.

While there is some variability among specific resins and plasticizers, it is generally simple to adjust the proportions of ingredients and processing parameters to provide the required properties in the plasticizer coatings and adhesives, including the avoidance of foaming of the formulation in use. Such adjustments of proportions and adaptations are well within the ordinary levels of skill in the art.

The Inert Filler Component

It is common to employ inert solid filler materials as extenders, or in some contexts as reinforcing fillers, in plastisol formulations. The most commonly employed extender filler in the art is calcium carbonate, which is inexpensive and effective in a number of uses.

The inert or reinforcing filler in the plastisols employed in conjunction with the present invention is any one of a wide diversity of materials which meet the requirements of the intended function. It is required that the inert or reinforcing filler be a free flowing solid at the temperatures and pressures of the processing, that it not react chemically with the microspheres, or with the other constituents of the system, e.g. the wetting agents and related components of the plastisol. The filler materials should be as non-abrasive as possible.

The inert or reinforcing filler may be selected from one or more components meeting the following general characteristics:

The inert or reinforcing filler should be a finely divided particulate or fibrous material. It may be spherical or irregular in shape, and it may be a solid or a hollow particle.

The inert or reinforcing filler should be a free-flowing solid under the processing conditions of the present invention. It should have a melting point, for example, above the temperature of the formulation and use of the plastisol, generally above about 180 degree(s) C.

The inert or reinforcing filler must be finely divided enough to be able to effectively blend into the plastisol in a substantially homogeneous dispersion. The maximum major dimension of the particle size should preferably be no larger than about the diameter of the microspheres, and preferably less. The minor dimensions will generally be as small as practicable, typically about 0.01 to 0.1 μm.

While the inert or reinforcing filler may be either organic or inorganic, there are ordinarily considerable advantages to the employment of inorganic materials as at least a substantial component of the inert or reinforcing filler. Such materials are commonly available in the dimensions of interest, they are common inclusions along with the microspheres in a wide diversity of syntactic foam plastisol formulations, they pose few problems in compounding and formulating, and they are generally less-expensive. It is also generally easier to assure that the inert or reinforcing filler does not itself develop undesirable characteristics in the processing, i.e., by becoming tacky or the like.

The inert or reinforcing fillers are desirably one or more materials which are pigments, reinforcing fillers, or reinforcing fibers in polymer formulations and thus are commonly used in the plastisol formulations where the microspheres are to be used. For example, talc, days, calcium carbonate, barium sulfate, alumina, such as particularly alumina tri-hydrate, silica, titanium dioxide, zinc oxide, calcium oxide, and the like may be employed. Other materials of interest include spherical beads, or hollow beads of ceramics, quartz, glass or polytetrafluoroethylene, i.e., TEFLON®, or the like. Among the fibrous materials of interest are glass fibers, cotton flock, polyamide fibers, particularly aromatic polyamides such as Nomex® and Kevlar®, carbon and graphite fibers and the like. Conductive inert or reinforcing fillers, such as conductive carbon, copper or steel fibers, and organic fibers with conductive coatings of copper or silver or the like are also of particular use in specific applications. All these are typical and illustrative of the commonly employed materials in syntactic polymer foam compositions, and those of ordinary skill in the art will be familiar with others that can also be suitably employed.

The selection of one or more suitable inert or reinforcing fillers among the wide diversity of materials that meet the general characteristics required of such materials is generally a matter of balancing a number of functional requirements in the procedure of the invention and in the context of the intended uses of the plastisol product.

When the present invention is being employed for a particular, known end use, it is ordinarily possible to tailor the selection of the inert or reinforcing filler to the specific requirements of use. As those of ordinary skill in the art will readily recognize, the fact that the inert or reinforcing filler will be employed in conjunction with the microspheres may be a factor that will require adjustment of proportions, but such requirements will not ordinarily be substantial or critical.

When combinations of different materials are employed as the inert or reinforcing filler, it is possible to stay within the compounding requirements of virtually any designed formulation.

The Filler Surfactant or Plasticizer

As noted above, it is preferred to insure that the filler is fully wet out with a surfactant or plasticizer (for the polyvinyl chloride or other resin) prior to its incorporation into the plastisol composition. Such a parameter makes it far easier to assure that the critical pigment volume concentration is not exceeded by absorption of the plasticizer from the plastisol resin. Viscosity of the plastisol formulation is also reduced. In addition, fully wetting the solid coating serves to lubricate the microspheres, reducing friction and heat increases during mixing and pumping. As those of ordinary skill in the art will readily recognize, the wide diversity of plasticizers and surfactants compatible with the plastisol formulation assures the availability of a suitable material for this purpose. The selection of a particular material and the aamount required to wet the filler material will be determined, in known fashion, by the nature of the filler. Such a requirement is well within the ordinary level of skill in the art, once the desirability of doing so is identified. The material chosen may be the same or different from that employed to plasticize the resin component of the plastisol. If the material is different from that intended to plasticize the resin, amounts substantially in excess of the minimum amount required to wet out the filler are not generally desirable.

Plastisol Formulating Methodology

In general terms, the techniques for compounding the plastisol adhesives and coatings in accordance with the present invention differ from those commonly employed in the art only in specific features, as discussed in the following paragraphs. The methods and equipment to be employed will be familiar to those of ordinary skill in the art, who will have no difficulty in adapting existing practices to the specific changes which are a part of the present invention.

As those of ordinary skill in the art will readily recognize from the foregoing discussion, it is preferred, and in some cases necessary that the hollow thermoplastic microspheres be treated with the surfactant prior to incorporation into the plastisol formulation.

It is also appropriate, when the solid barrier coating is present on the microspheres, and when the inert filler is to be coated with plasticizer or surfactant, that these steps be done separately, prior to incorporation of these components into the plastisol formulation.

Also as noted above, viscosity of the plastisol formulated in accordance with the present invention can be lower than typical of prior art plastisol formulations, so that mixing can proceed effectively at lower power and with less internal friction and heat build-up. Since it is the heat of mixing the plastisol that is one of the contributing factors in the release of gases from the microsphere interior, the reduced friction and shear of mixing in the present invention is highly desirable in minimizing the release of the blowing agent from the microspheres into the plastisol.

It is also appropriate to limit the temperature of the plastisol, during compounding and subsequently, as during use, to the lowest level effective with the requirements of the use. The reduced viscosity of the plastisol permits lower temperatures to be used without degrading the product characteristics. The lower temperature, in turn, limits the loss of the blowing agent from the interior of the microspheres, contributing to the elimination of the source of the foaming problem. It is preferred that the maximum temperature be limited to no more than 30° C. below the glass transition temperature of the polymer of which the microspheres are formed, and still more preferably to no more than 50° C. below the glass transition temperature. Still lower temperatures are even better when possible.

Plastisol Use Methodology

The conditions and requirements of use of the plastisol compositions of the present invention are little altered from those normally employed in the art. There are a few adaptations of the usual methodologies which are appropriate.

The same considerations employed in compounding the plastisols in accordance with the present invention, i.e., the avoidance of higher temperatures than required and the avoidance of high shear conditions, also apply to their use.

In addition, as discussed above, high pressures in pumping the plastisols should be limited or avoided, using the minimum pressures effective to deliver the plastisol in the equipment employed. As noted, the application of high pressures during pumping is directly related to the release of the blowing agent from the interior of the microsphere component of the plastisols, and is a major contributor to the foaming problems encountered in prior art efforts. Fortunately, the reduced viscosity of the plastisols formulated in accord with the present invention facilitates pumping at lower applied pressures, limiting the pressure differential across the cell walls of the microspheres when the applied pressure is released. Adequate pumping volumes and adequate pressures for delivering or spraying of the reduced viscosity plastisols of the present invention remains effective at adequate production rates. The specific pressures required are dependent on the final viscosity of the plastisol and the specific application equipment used, but it has been found that the effective pressures are typically about 20% less than those typically required when prior art plastisols are employed.

Elastomer Filled Plastisols

While microsphere filled plastisols formulated in accordance with the foregoing description are fully effective in most circumstances, we have observed that there are some circumstances and conditions in which the foaming and frothing problems persist.

Notably, some equipment operates at high pressures, and in some situations the plastisol formulation is held under high static pressure for protracted periods. As noted above, such practices impose higher than normal difficulties with the loss of gas from the microspheres and an increased tendency to cause the plastisol to form excessively when the pressure is released. We have found it effective, in addition to the foregoing features of the invention, to additionally modify the plastisol formulation to include an elastomeric polymer.

In most circumstances when an elastomer is to be employed, it may serve as an energy absorbant.

When the plastisol is subjected to high pressures, and particularly static high pressures sustained over considerable periods, the elastomeric component reduces or prevents foaming or frothing of the plastisol upon application and release of the pressure. While the effect is not fully understood, it may be possible that the energy absorbing nature of the elastomeric inert filler relieves the microspheres from the effects of the pressure. The data suggests that compression rebound or relaxation of the elastomer component, when the applied pressure is released, permits the microspheres to respond to the release of pressure at a rate which does not result in loss of the blowing agent through the cell walls.

It is preferred that the compressible elastomer particles employed afford the following specific characteristics:

A. The elastomer polymer should be compatible with the plastisol matrix.
B. The constituents of the elastomer should not react with or dissolve in any component of the plastisol.
C. The elastomer should not include any component, such as extenders, fillers, dyes or pigments and the like, which can bleed into the plastisol to adversely affect the appearance or properties of the plastisol.
D. The elastomer particles should not melt or flow at the processing temperatures and pressures employed in the formulation or use of the plastisol.
E. Preferably, the elastomer particles should have a long compression relaxation time (hysteresis).
F. The surface of the elastomer should be freely wettable by the primary plasticizer and/or the PVC or other polymer of the plastisol.
G. To best prevent foaming, the proportion, by volume, of the elastomer particles should be at least about 5% of the plastisol, preferably at least about 10%. If lesser amounts are employed, the problem may be reduced, but not as fully resolved as possible with higher amounts.
H. The upper limit of the proportion of the elastomer is, in most circumstances, the level at which the properties of the plastisol are compromised, and may be as high as 30 to 40 weight percent, or more.

Based on the efforts to date, we prefer a cross-linked nitrile rubber for the particulate elastomer, but any of a wide variety of elastomers, whether cross-linked or thermoplastic elastomers, which meet the foregoing criteria can be employed to good effect.

Such elastomeric particles are generally non-abrasive. It is preferred to employ the compressible elastomeric component as a replacement, in whole or in part, for abrasive inorganic fillers in the plastisol.

EXAMPLES

Example 1

Twelve kilograms of hollow thermoplastic microspheres (Dualite® M6032AE, from Pierce & Stevens Corporation, Buffalo, N.Y.) were mixed with 1.2 kilograms of a fluoroaliphatic non-ionic surfactant (Fluorad® FC-430 from 3 M Corporation, Minneapolis., Minn.) and 25 kilograms of DINP. Mixing was continued until the surface of the microspheres was fully wet. Mixing was continued while, in succession, 32.5 kilograms of powdered PVC polymer resin, followed by 2.4 kilograms of CaO, 1.2 kilogram of $TiO_2$, 0.6 kilograms of Interstab CZ, (a zinc Sa H. of an organic acid in glycerine, containing 3% zinc,) an additional 23.1 kilograms of DINP, 1.2 kilograms of Versamid 66, (an amido amide resin solution in di-octyl phthalate,) and then 0.6 kilograms of fumed silica were added. Mixing was continued until all the components were blended and a homogeneous dispersion was attained. For the entire procedure, care was taken to maintain the batch temperature below 90° F.

The plastisol was tested to the standards employed in the art for automotive PVC plastisol sealers, and exhibited the properties shown in Table I:

TABLE I

| | |
|---|---|
| Viscosity, 20 psi | 60 sec. |
| Slump | 1 mm |
| % Elongation | 105% |

TABLE I-continued

| | |
|---|---|
| Tensile | 145 psi |
| Shear | 150 psi |
| | 100% C/F |
| Specific gravity, Initial | 0.61 |
| Specific gravity, Pumped | 0.64 |
| % change | 7.9% |
| Pumping Flow Rate (g/sec) | 1.1 |

Upon application, by extruding and brushing onto a substrate, no foaming and no surface porosity occurred. No degradation of properties was observed upon storage at ambient conditions.

Example 2

Fifteen kilograms of cross-linked nitrile rubber (Chemigum P83, Goodyear, Akron, Ohio) was mixed with 20 kilograms of DINP in a heated sigma blade mixer until a thick paste was formed. The mixture was then transferred to a double planetary mixer and paste was thinned by adding 15 kilograms of additional DINP. The mixture was then allowed to cool to below 90° F. using cooling water in the jacket of the mixer.

In a separate container, 7 kilograms of hollow thermoplastic microspheres (Dualite® microspheres M 6032AE, Pierce & Stevens Corporation, Buffalo, N.Y.) were mixed with 5 kilograms of DINP and 0.6 kilograms of fluoroaliphatic non-ionic surfactant (Fluorad FC-430, 3 M Corporation, Minneapolis, Minn.).

The microsphere mixture was then added to the rubber paste and mixed until the microspheres were fully wet.

To the microsphere-rubber mixture, 15 kilograms of PVC polymer resin were added with continuous mixing with an additional 17.4 kilograms of DINP, followed sequentially by 2 kilograms of CaO, 0.6 kilograms of INTERSTAB CZ, 1.2 kilograms of $TiO_2$ and 1.2 kilograms of VERSAMID 66.

Mixing was continued with cooling to assure the temperature remained below 90° F. until all the ingredients were homogeneously dispersed.

Testing as in Example 1 showed similar properties.

The vinyl plastisol was tested for foaming under high static pressure conditions by allowing the material to sit in a pressureized chamber maintained at 1,500 psi for one hour. The presure was released, the plastosol was spread and allowed to stand for 30 minutes. Inspection showed greatly reduced foaming compared to similar materials formulated without the nitile rubber and tested under the static pressure conditions.

The foregoing descriptions and examples are intended to be illustrative and suggestive to those of ordinary skill in the art, and not to be limiting or definitive of the scope of the invention. Many variations in the formulations and procedures will be apparent to those of ordinary skill in the art provided the guidance and directions of the present disclosure, and such variations are within the scope of the present invention. The scope of the invention is limited and defined only in the following claims.

What is claimed is:

1. In a plastisol composition comprising a thermoplastic resin, a plasticizer for said resin, an optional inert filler and hollow thermoplastic microspheres, the improvement comprising:

A. providing said thermoplastic microspheres with a coating of a surfactant which preferentially wets the surface of said microspheres, in an aamount sufficient to substantially completely coat the surface of said microspheres; and B. combining said microspheres and said optional inert filler into said plastisol formulation in a proportion which does not exceed the critical pigment volume concentration of said plastisol.

2. The plastisol composition of claim 1 including an inert filler selected from the group consisting of talc, clay, calcium carbonate, barium sulfate, alumina, alumina tri-hydrate, silica, titanium dioxide, zinc oxide, calcium oxide, spherical beads, or hollow beads of ceramics, quartz, glass or polytetrafluoroethylene, fibrous materials glass fibers, cotton flock, polyamide fibers, polyaramides carbon and graphite fibers, conductive carbon, copper or steel fibers, and organic fibers with conductive coatings of copper or silver, inert, energy absorbing particulate elastomers, and mixtures thereof, in an aamount of up to about 45 weight percent of said plastisol.

3. The plastisol composition of claim 1 wherein said thermoplastic microspheres are formed of a polymer selected from the group consisting of homopolymers and copolymers of poly(vinylidene dichloride) and mixtures thereof, having a diameter of from about 2 micrometers to about 1 millimeter and a density of from about 0.015 to about 0.9 g/cm$^3$.

4. The plastisol composition of claim 1 wherein said surfactant is a member selected from the group consisting of halo-aliphatic non-ionic surfactants, polysiloxane non-ionic surfactants, and fatty acid ester anionic surfactants.

5. The plastisol composition of claim 1 wherein said inert filler is a particulate, energy absorbing elastomeric polymer.

6. The plastisol composition of claim 5 wherein said elastomeric polymer is a cross-linked nitrile rubber.

7. The plastisol composition of claim 3 wherein said hollow thermoplastic microspheres have a density of from about 0.03 to about 0.06 g/cm$^3$.

8. The plastisol composition of claim 2 wherein said inert filler is wet with a coating of a surfactant or plasticizer prior to incorporation into said composition.

9. The plastisol composition of claim 1 wherein said surfactant is a fluoroaliphatic non-ionic surfactant.

10. In a plastisol composition comprising a thermoplastic resin, a plasticizer for said resin, an optional inert filler and hollow thermoplastic microspheres, the improvement comprising:

A. providing said thermoplastic microspheres with a solid particulate barrier coating thermally bonded to the surface thereof, and a coating of a surfactant which preferentially wets the surface of said microspheres, in an aamount sufficient to substantially completely coat the surface of said microspheres;

B. providing said solid particulate barrier coating with a coating of a surfactant or plasticizer which wets the surface of said barrier coating, in and aamount sufficient to substantially completely coat the surfaces of said barrier coating; and C. combining said microspheres and said optional inert filler into said plastisol formulation in a proportion which does not exceed the critical pigment volume concentration of said plastisol.

11. The plastisol composition of claim 10 including an inert filler selected from the group consisting of talc, clay, calcium carbonate, barium sulfate, alumina, alumina tri-hydrate, silica, titanium dioxide, zinc oxide, calcium oxide, spherical beads, or hollow beads of ceramics, quartz, glass or polytetrafluoroethylene, fibrous materials glass fibers, cotton flock, polyamide fibers, polyaramides carbon and graphite fibers, conductive carbon, copper or steel fibers, and organic fibers with conductive coatings of copper or silver, inert, energy absorbing particulate elastomers, and mixtures thereof, in an aamount of up to about 40 weight percent of said plastisol.

12. The plastisol composition of claim 10 wherein said thermoplastic microspheres are formed of a polymer selected from the group consisting of homopolymers and copolymers of poly(vinylidene dichloride) and mixtures thereof, having a diameter of from about 2 micrometers to about 1 millimeter and a density of from about 0.015 to about 0.9 g/cm$^3$.

13. The plastisol composition of claim 10 wherein said surfactant is a member selected from the group consisting of halo-aliphatic non-ionic surfactants, polysiloxane non-ionic surfactants, and fatty acid ester anionic surfactants.

14. The plastisol composition of claim 10 wherein said inert filler is a particulate, energy absorbing elastomeric polymer.

15. The plastisol composition of claim 14 wherein said elastomeric polymer is a cross-linked nitrile rubber.

16. The plastisol composition of claim 12 wherein said hollow thermoplastic microspheres have a density of from about 0.03 to about 0.06 g/cm$^3$.

17. The plastisol composition of claim 10 wherein said solid particulate barrier coating is wet with a coating of a surfactant or plasticizer prior to incorporation into said composition.

18. The plastisol composition of claim 10 wherein said inert filler is wet with a coating of a surfactant or plasticizer prior to incorporation into said composition.

19. In the method of making a plastisol composition comprising a thermoplastic resin, a plasticizer for said resin, an optional inert filler and hollow thermoplastic microspheres, the improvement comprising:

A. coating said thermoplastic microspheres with a surfactant which preferentially wets the surface of said microspheres, in an aamount sufficient to substantially completely coat the surface of said microspheres;

B. combining said microspheres and said optional inert filler into said plastisol formulation in a proportion which does not exceed the critical pigment volume concentration of said plastisol;

C. mixing and pumping said formulation at the lowest effective temperatures and shear forces required to produce said plastisol composition.

20. The method of making a plastisol composition of claim 19 including an inert filler selected from the group consisting of talc, clay, calcium carbonate, barium sulfate, almuina, alumina tri-hydrate, silica, titanium dioxide, zinc oxide, calcium oxide, spherical beads, or hollow beads of ceramics, quartz, glass or polytetrafluoroethylene, fibrous materials glass fibers, cotton flock, polyamide fibers, polyaramides carbon and graphite fibers, conductive carbon, copper or steel fibers, and organic fibers with conductive coatings of copper or silver, inert, energy absorbing particulate elastomers, and mixtures thereof, in an aamount of up to about 40 weight percent of said plastisol.

21. The method of making a plastisol composition of claim 19 wherein said thermoplastic microspheres are formed of a polymer selected from the group consisting of homopolymers and copolymers of poly(vinylidene dichloride) and mixtures thereof, having a diameter of from about 2 micrometers to about 1 millimeter and a density of from about 0.015 to about 0.9 g/cm$^3$.

22. The method of making a plastisol composition of claim 19 wherein said surfactant is a member selected from the group consisting of halo-aliphatic non-ionic surfactants, polysiloxane non-ionic surfactants, and fatty acid ester anionic surfactants.

23. The method of making a plastisol composition of claim 19 wherein said inert filler is a particulate, energy absorbing elastomeric polymer.

24. The method of making a plastisol composition of claim 23 wherein said elastomeric polymer is a cross-linked nitrile rubber.

25. The method of making a plastisol composition of claim 21 wherein said hollow thermoplastic microspheres have a density of from about 0.03 to about 0.06 g/cm$^3$.

26. The method of making a plastisol composition of claim 19 wherein said inert filler is wet with a coating of a surfactant or plasticizer prior to incorporation into said composition.

27. The method of making a plastisol composition of claim 19 wherein said surfactant is a fluoroaliphatic non-ionic surfactant.

28. In the method of making a plastisol composition comprising a thermoplastic resin, a plasticizer for said resin, an optional inert filler and hollow thermoplastic microspheres, said thermoplastic microspheres, the improvement comprising:

A. coating said thermoplastic microspheres with a solid particulate barrier coating thermally bonded to the surface thereof, and a surfactant which preferentially wets the surface of said microspheres, in an aamount sufficient to substantially completely coat the surface of said microspheres;

B. coating said solid particulate barrier coating with a surfactant or plasticizer which preferentially wets the surface of said barrier coating, in and aamount sufficient to substantially completely coat the surfaces of said barrier coating; and C. combining said microspheres and said optional inert filler into said plastisol formulation in a proportion which does not exceed the critical pigment volume concentration of said plastisol.

29. The method of making a plastisol composition of claim 28 including an inert filler selected from the group consisting of talc, clay, calcium carbonate, barium sulfate, alumina, alumina tri-hydrate, silica, titanium dioxide, zinc oxide, calcium oxide, spherical beads, or hollow beads of ceramics, quartz, glass or polytetrafluoroethylene, fibrous materials glass fibers, cotton flock, polyamide fibers, polyaramides carbon and graphite fibers, conductive carbon, copper or steel fibers, and organic fibers with conductive coatings of copper or silver, inert, energy absorbing particulate elastomers, and mixtures thereof, in an aamount of up to about 40 weight percent of said plastisol.

30. The method of making a plastisol composition of claim 28 wherein said thermoplastic microspheres are formed of a polymer selected from the group consisting of homopolymers and copolymers of poly(vinylidene dichloride) and mixtures thereof, having a diameter of from about 2 micrometers to about 1 millimeter and a density of from about 0.015 to about 0.9 g/cm$^3$.

31. The method of making a plastisol composition of claim 28 wherein said surfactant is a member selected from the group consisting of halo-aliphatic non-ionic surfactants, polysiloxane non-ionic surfactants, and fatty acid ester anionic surfactants.

32. The method of making a plastisol composition of claim 28 wherein said inert filler is a particulate, energy absorbing elastomeric polymer.

33. The method of making a plastisol composition of claim 32 wherein said elastomeric polymer is a cross-linked nitrile rubber.

34. The method of making a plastisol composition of claim 30 wherein said hollow thermoplastic microspheres have a density of from about 0.03 to about 0.06 g/cm$^3$.

35. The method of making a plastisol composition of claim 28 wherein said solid particulate barrier coating is wet with a coating of a surfactant or plasticizer prior to incorporation into said composition.

36. The method of making a plastisol composition of claim 28 wherein said inert filler is wet with a coating of a surfactant or plasticizer prior to incorporation into said composition.

* * * * *